July 8, 1969        J. H. HOLSTEIN        3,454,142

POSITIVE STRAIGHT LINE ARTICLE CONVEYING MECHANISM

Filed Feb. 27, 1967

JOHN H. HOLSTEIN
INVENTOR

Huebner & Worrel
ATTORNEYS

JOHN H. HOLSTEIN
INVENTOR

Huebner & Worrel
ATTORNEYS

# United States Patent Office 3,454,142
Patented July 8, 1969

3,454,142
POSITIVE STRAIGHT LINE ARTICLE
CONVEYING MECHANISM
John H. Holstein, 404 E. Sussex Way,
Fresno, Calif. 93704
Continuation-in-part of application Ser. No. 260,801,
Feb. 25, 1963. This application Feb. 27, 1967, Ser.
No. 618,734
Int. Cl. B65g 15/14, 47/26
U.S. Cl. 198—162                 3 Claims

ABSTRACT OF THE DISCLOSURE

Apparatus for conveying articles successively along a path of movement and having article holding devices contactable with the articles for precisely controlling the alignment, disposition and sequencing thereof and including movable brackets carrying rollers disposed in spaced stationary guides operable to prevent inadvertent turning of the brackets about horizontal and vertical axes while the holding devices are in contact with the articles.

---

This application is a continuation-in-part by my copending application Ser. No. 260,801, filed Feb. 25, 1963, which has matured into Patent No. 3,306,803, granted Feb. 28, 1967.

Background of the invention

The present invention relates to conveying mechanisms for articles to be sequentially positioned at stations where further or subsequent operations thereon are to be performed and more particularly to a machine for conveying articles, such as containers and the like, wherein it is desired to perform one or more operations on the conveyed containers and in which the containers are positively held against angular and rotational movement so as to achieve exact positioning as desired for the precise affixation thereto of items such as labels, lids, caps and the like.

Heretofore conveyors for articles and items have been provided, but the majority thereof, when attempting to effect a continuous flow of such items have imposed or impressed upon the individual items forces which tended to angularly or rotationally affect the disposition or alignment of the item with respect to equipment adapted to perform subsequent operations on an item conveyed by the conveyor.

In certain food and drink processing industries, for example, the goods to be packed or bottled are of widely differing characteristics. Each of the goods may be packed in containers having distinctively different sizes and external configurations particularly suited to the goods or which might be chosen for marketing reasons such as consumer appeal. In addition, each type or configuration of container must be marked with a distinctive label, and many different types of lids, labels or caps are applied to the containers, dependent upon the shape, configuration and marketable attractiveness. In order to permit an efficient and automated flow of containers through a diversified processing plant there must be a positive control of the container to permit sequential operations thereon, even after passing through a filling process or machine.

Summary of the invention

A primary or main object of the present invention is to provide a conveying mechanism adapted to present an article to be processed with the least possible chance of misalignment, or application of forces thereagainst which might be either laterally or radially disposed with respect to the path of movement of the conveying mechanisms utilized.

Another object is to provide a conveying mechanism wherein the articles or items to be processed are drawn in a straight line path, and so maintained at a subsequent operating station.

Another object is to provide a conveying mechanism in which coacting article holders are supported for movement in a path and are held in alignment against forces tending to rotate the holders about horizontal and/or vertical axes.

Another object is to provide movable holding devices which are maintained in substantially constant attitude against forces tending to turn them about horizontal or vertical axes and are adapted to contact articles, such as containers and the like, for application thereto of items, such as labels, caps, lids and the like, without misalignment.

The aforementioned and other objects and advantages are achieved by conveying means including holding devices which coact to grasp the article while it is being conveyed, each device being mounted on a movable bracket having vertically spaced rollers mounted for rotation about vertical axes disposed in vertically spaced stationary guides operable to prevent turning of the brackets about horizontal and vertical axes for maintaining substantially constant attitudes with respect to orthogonal planes of reference, the guides defining a path of movement for the brackets.

Description of embodiments

Figure 1:
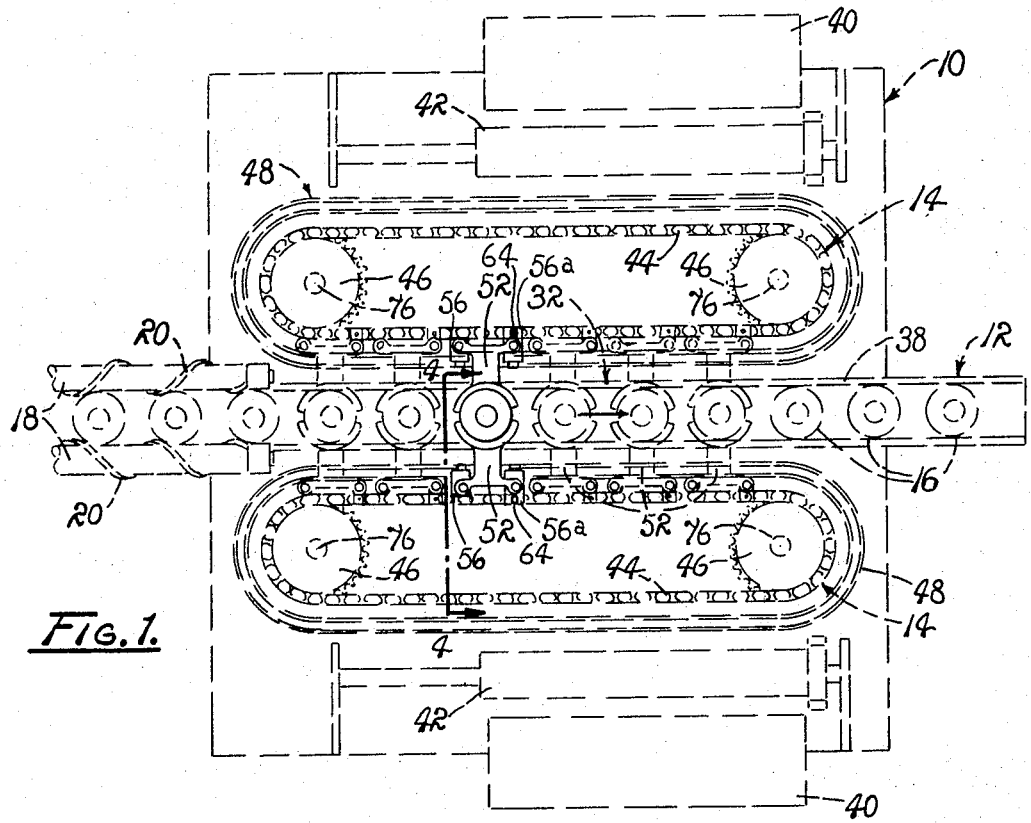
FIG. 1 is a fragmentary top plan view of conveyor mechanism in accordance with the present invention.

Referring now in more detail to the drawings, in FIG. 1 there is disclosed schematically a machine frame, generally designated 10, which operatively supports an article conveyor 12 adapted to be driven in synchronism with chain and sprocket mechanisms, generally designated 14, on opposite sides thereof. For purposes of depicting a workable embodiment of the invention, the conveyor is shown as conveying a plurality of bottles 16, which have been filled at a station prior to the mechanism shown and described in this application.

Rotatably mounted article feed shafts 18 are operatively associated with the machine, and driven sequentially in time from any suitable drive mechanism, with the remainder of the apparatus. These shafts 18 have helical article feeding or propelling members 20, of a type known in the art, adapted for engaging the external surfaces of bottles 16, or other cylindrical type containers, to move the bottles or containers forwardly into the mechanism of the present application.

Figure 4:
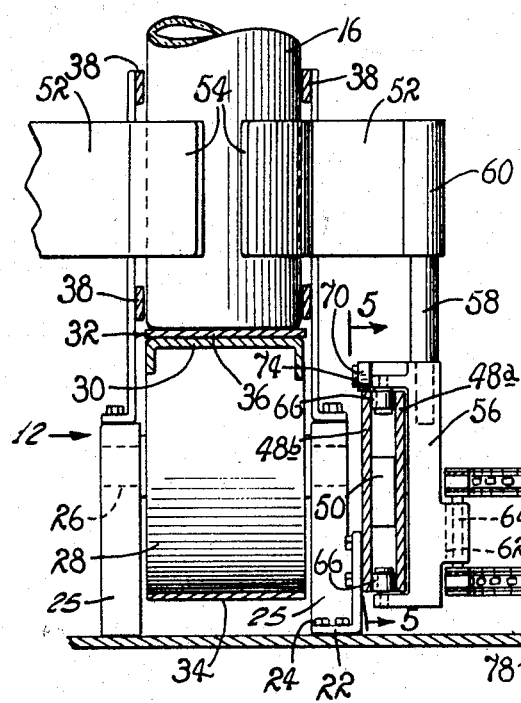
FIG. 4 is a sectional view taken on line 4—4 of FIG. 1.

Referring to FIG. 4, brackets 22, only one of which is shown, are secured on the frame by means of bolts 24 or the like adjacent to pairs of bearing journals 25 in which are supported for rotation shafts 26 at opposite ends of the conveyor 12. The shafts mount conveyor supports 28 which can be in the nature of wheels or cylinders. A conveyor support 30 is mounted above the supports 28 and extends longitudinally of the machine. A conveyor belt 32, or any desired construction, is operatively associated with the cylinders or wheels 28. The lower run of such a conveyor belt is shown at 34 in FIG. 4, with the upper run 36 being supported by the upper surface of conveyor support 30.

Article side guides 38 are mounted on the bearing journals 25 and serve partially to laterally position articles being conveyed along the run of the conveyor mechanism.

While the articles are longitudinally conveyed or transported by means of the conveyor mechanism as generally described, provision is made for positively guiding and controlling the position of the articles so that they can be operated upon by various mechanisms in completely timed sequence at the various stations of operation. This is accomplished by means associated with the sprocket and chain drive, generally designated 14, and which can have different mechanical constructions, all of which serve the purpose of properly aligning and maintaining such alignment of articles being conveyed in timed sequence with the remainder of the machine.

Mechanisms, schematically shown in FIG. 1, can be used for affixing labels, for example, to an article or bottle passing through the machine, and includes label racks 40 on either side of the machine, and movable suction head mechanisms 42 which serve to extract single labels from the label racks and apply them selectively to a bottle or container moving along the path of travel on the conveyor. Such mechanisms form no part of the present invention and need not be further described in detail hereinafter.

The actual mechanism for positively propelling and maintaining the containers in proper position will now be explained with reference to various figures of the drawings. Chain and sprocket mechanisms 14 include chains 44 which are of a hollow pin construction operatively mounted on each side of the path of travel of the containers, and are operatively associated with sprocket wheels 46 for timed and coordinated movement thereby. The path of movement of the chains is related to tracks 48, positioned orbitally around the path of movement of the chains, and consisting of spaced track members 48a and 48b. The tracks are supported by the brackets 24 and are maintained in the spaced position by means of spacers 50 interposed therebetween, and connected thereto by any suitable means such as by welding.

Figure 2:
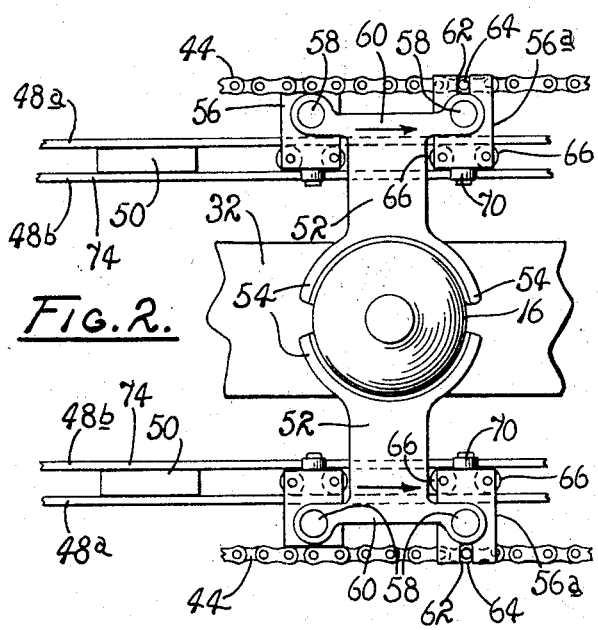
FIG. 2 is an enlarged fragmentary plan view of a single item conveying station.

Operatively associated with the tracks 48 and the chains 44 on each side of the conveyor 12 are article gripping means in the form of pairs of coacting arms 52, only one pair of which are shown in full lines in FIG. 1. In FIGS. 2 and 4, the arms are shown on an enlarged scale and each arm is formed with an arcuate end 54 defining a portion of a cylindrical surface. The partial cylindrical surfaces of each pair of coacting arms are adapted to be brought into facing relation for gripping and holding a container 16 therebetween.

Figure 3:
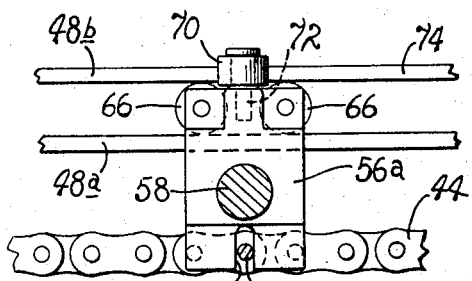
FIG. 3 is a fragmentary enlarged plan view of a single station as shown in FIG. 2.

The arms 52 have associated therewith longitudinally spaced brackets 56, 56a and vertical posts 58, the brackets having openings in which the lower ends of the posts 58 are engaged. Each arm has an end 60 with openings therein which receive the upper ends of the posts 58 associated therewith. In the embodiment shown in detail in FIG. 2 the lead bracket 56a, has a vertical slot 62 provided therein which is adapted to engage with pins 64, operatively interconnected into the chains 44 on opposite sides of the bottle controlling and moving mechanism. It can be seen from FIG. 3 of the drawings that these slots have such a depth whereby the pins can move transversely in and out, and yet will in no way vary or affect, or cause any lateral deflection or movement of the chain in its course or path of travel around the motivating sprocket wheels and will not impose undesired forces or movement of the containers. Each arm 52 thus has a sliding one-point or articulate drive connection with its associated chain 44.

As pointed out hereinbefore, it is necessary to maintain positive control of the conveyors to insure correct and positive alignment thereof at all times, and properly aligned and oriented presentation of the articles to mechanisms for operating on the articles or containers. As will be obvious any slack in, or lack of positive control of the chains and the arms 52 would not produce the desired end results.

Figure 5:
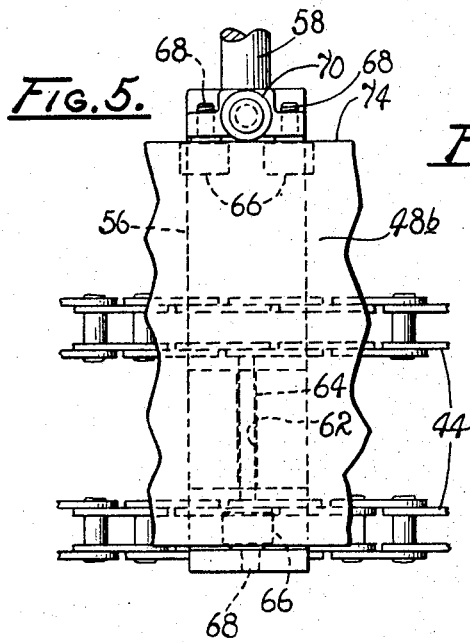
FIG. 5 is a fragmentary sectional view taken on line 5—5 of FIG. 4.

Means to prevent such possibilities are provided and primarily consist of a plurality of rollers 66, so connected with the brackets 56 and 56a, and so cooperable with the tracks as to vertically and horizontally stabilize the brackets, and therefore the article gripping or controlling means 52. The rollers 66 are spaced horizontally and vertically and are rotatably journalled on vertical shafts 68 suitably mounted in the brackets, best seen in FIG. 5. These rollers 66 are so dimensioned to closely fit within, and be guided between the spaced track members 48a and 48b. This mounting prevents angular movement of the brackets mounting the article gripping and controlling means 52 about orthogonal horizontal and vertical axes even though the pulling force of the chain is laterally displaced with respect to the means 52. Rollers 70 are mounted on the brackets by means of horizontal stub shafts 72, one for each side of a bracket, and ride on the upper surface 74 of one spaced track member, preferably the inner one 48b, best seen in FIG. 3. This supports the weight not only of the bracket but also the article gripping and controlling means 52, and prevents angular movement thereof in a vertical plane. With such a construction the posts 58, carried by the brackets, and the article gripping and controlling means are at all times positively aligned in vertical and horizontal planes.

In the embodiment shown in detail in FIG. 4, the drive means for the brackets consists of a plurality of shafts 76 journalled in bearings 78 and 80 attached to the frame 10 by means of bolts or the like. Upper and lower spaced sprocket wheels 46a and 46b are secured in relatively closely spaced positions on shaft 76 by means of hubs 82 and pins 84. The chains 44 are operatively engaged with the spaced sprocket wheels. The pins 64 interengage between the sprocket wheels, and pass through openings 62 in the brackets, which in this embodiment are substantially C-shaped in cross-section. Close tolerances are utilized in the apparatus to positively prevent play in the mechanism. A lower driving sprocket wheel 88 is mounted on shaft 76 by means of hub 90 and pin 92, and is appropriately driven from a source of power which is tied into the over-all drive mechanism for the over-all machine so as to be in timed relation therewith.

Figure 6:
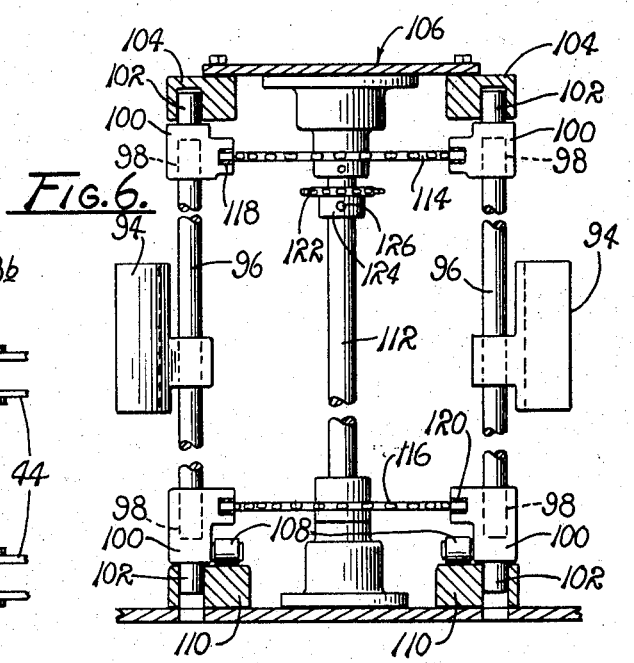
FIG. 6 is an elevational view of a different embodiment of driving mechanism for the conveyor incorporating the principles and teachings of the present invention.

A different form of apparatus for driving or moving the containers is shown in FIG. 6. The bottle guides 94 are generally similar to those indicated at 52 in the other embodiment of the invention, but are mounted on extended posts 96, the ends 98 of which are mounted in drive brackets 100. The drive brackets have rollers 102 rotatably journaled therein, which are adapted for insertion in and guidance by guideways 104, attached to frame 106 in any desied manner. If desired a plurality of these vertically mounted rollers 102 can be utilized for each guide bracket, but in actual practice this is not believed necessary. A horizontally mounted roller 108 is rotatably journalled in each of the lower brackets 100 connected to the posts 96, and supported on a track 110. The latter rollers provide vertical support for the drive mechanism in the same manner as the horizontal rollers 70 in the previous embodiment. The drive mechanism includes a rotatably mounted shaft 112 having sprocket wheels 114 and 116 keyed thereon which are operatively associated with drive chains 118 and 120 which in turn are operatively connected to the brackets. A driving sprocket wheel 122 is operatively associated with the over-all drive mechanism for the conveyor and is attached to shaft 112 by means of hub 124 and pin 126. This embodiment of the invention, while varying in constructional details, provides the same end results of maintaining proper positioning and alignment of containers being conveyed to insure accuracy of subsequent operation thereon.

Figure 7:
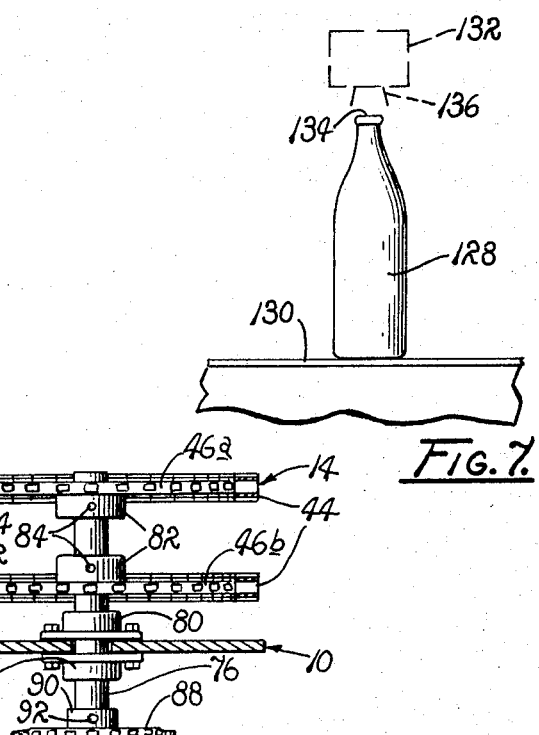
FIG. 7 is a fragmentary schematic view of a capping station or the like for a bottle, as fragmentarily shown in FIG. 4.

FIG. 7 schematically depicts a subsequent operation which might occur when the container is a bottle such as at 128, being moved along a conveyor 130 of either of the types hereinbefore shown and described. A capper unit 132 of any known type is positioned above the uppermost portion 134 and is adapted for placement of a cap in or on a bottle opening. A cap aligner is generally shown at 136, which also is of a generally known type. When such a capper is utilized in conjunction with the conveyor mechanism of the present invention misalignment, resulting in possible nonapplication, or misapplication of a cap, or the chances of damage to the bottle, are substantially eliminated.

The same degree of accuracy prevails regardless of the operation which is to be performed on a container being moved in a straight or rectilinear path with the conveyor system of the present invention.

The operation of the present apparatus will be readily understood from the foregoing description and a detailed explanation thereof is not considered necessary.

While the apparatus of the present invention has been described as controlling the attitude of an article conveyed along a straight path, it will be appreciated that it is equally applicable in systems where the path is not straight but instead is curved, circular or sinuous.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An article conveying mechanism including an article conveyor, article controlling means associated with said conveyor on opposite sides thereof and contactable with an article being conveyed on the conveyor for controlling the alignment and disposition thereof, means for driving said conveyor and said article controlling means in synchronism, said article controlling means including brackets disposed respectively on the opposite sides of the conveyor, drive means operatively associated with said brackets, the brackets being so vertically and laterally supported during movement as to prevent lateral, angular and rotational forces from being applied to an article contacted by the controlling means while being moved along the conveyor, said drive means including sets of vertically spaced drive chains operatively mounted for movement on opposite sides of the conveyor, means connecting each of the brackets in vertical disposition between a set of chains for movement thereby, and means adapted for maintaining the vertical disposition of said brackets, each of said chains being driven during at least one portion of its travel in a path substantially equally spaced from the path of travel of said conveyor, said last-named means including spaced guide tracks positioned approximate to each chain of the sets of said chains, and vertically spaced rollers mounted for rotation about vertical axes on the brackets, said rollers engaging between said guide tracks.

2. An article conveying mechanism as claimed in claim 1, said vertically spaced rollers being longitudinally spaced on said brackets to provide positive rectilinear control of movement of articles on said conveyor.

3. An article conveying mechanism including an article conveyor, article controlling means associated with the conveyor on opposite sides thereof and contactable with an article being conveyed on the conveyor for controlling the alignment and disposition thereof, operatively interconnected drive means for the conveyor and article controlling means, the article controlling means including brackets disposed respectively on the opposite sides of the conveyor, a drive mechanism operatively associated with the brackets and so vertically and laterally supported as to prevent lateral, angular and rotational forces from being applied to the article while being conveyed, said drive mechanism including chains movably mounted on opposite sides of the conveyor, means connecting the brackets to the chains for movement thereby, said last-named means being adapted for maintaining the brackets vertically aligned, said chains comprising hollow pin chains, said brackets having laterally disposed slots therein, pins extending through said slots and through said hollow pin chain adapted to permit lateral variation in movement of said chain and applying only a rectilinear force on said chains without varying lateral forces applied on said brackets, to thereby prevent lateral or rotational forces from being transmitted to said brackets.

References Cited

UNITED STATES PATENTS

| | | | |
|---|---|---|---|
| 3,074,533 | 1/1963 | Ninneman | 198—34 |
| 1,925,899 | 9/1933 | Glidden et al. | 198—131 X |
| 2,687,051 | 8/1954 | Brandt | 198—131 X |
| 2,830,712 | 4/1958 | Sykokis | 198—19 X |
| 2,887,209 | 5/1959 | Merchant | 198—137 X |
| 3,006,455 | 10/1961 | Dudnick | 198—131 X |
| 3,204,756 | 9/1965 | Lesch | 198—19 X |

RICHARD E. AEGERTER, *Primary Examiner.*

U.S. Cl. X.R.

198—34